(12) United States Patent
Saitou

(10) Patent No.: US 10,043,299 B2
(45) Date of Patent: Aug. 7, 2018

(54) IMAGE PROCESSING APPARATUS FOR GENERATING A NEW MOVING IMAGE FROM A MOVING IMAGE

(71) Applicant: CASIO COMPUTER CO., LTD., Shibuya-ku, Tokyo (JP)

(72) Inventor: Kouichi Saitou, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 150 days.

(21) Appl. No.: 14/878,406

(22) Filed: Oct. 8, 2015

(65) Prior Publication Data

US 2016/0189412 A1 Jun. 30, 2016

(30) Foreign Application Priority Data

Dec. 25, 2014 (JP) ................................ 2014-262444

(51) Int. Cl.
*G06T 11/60* (2006.01)
*G06T 13/80* (2011.01)

(52) U.S. Cl.
CPC .............. *G06T 11/60* (2013.01); *G06T 13/80* (2013.01); *G06T 2207/10016* (2013.01)

(58) Field of Classification Search
None
See application file for complete search history.

(56) References Cited

U.S. PATENT DOCUMENTS 8,466,961 B2    6/2013   Sekine et al.
8,570,404 B2   10/2013   Ando et al.
2009/0244096 A1*  10/2009  Yamaji .................... G06T 11/00
                                                        345/630
2009/0287996 A1*  11/2009  Norimatsu ............. G06T 11/00
                                                        715/243
2012/0105657 A1*   5/2012  Yokohata ............. H04N 5/2257
                                                       348/208.4
2013/0328918 A1*  12/2013  Okamura ............. G06L 7/0079
                                                        345/625

(Continued)

FOREIGN PATENT DOCUMENTS

JP      2006099058 A     4/2006
JP      2007150603 A     6/2007
JP      2009081575 A     4/2009

(Continued)

OTHER PUBLICATIONS

Japanese Office Action (and English translation thereof) dated Sep. 13, 2016, issued in counterpart Japanese Application No. 2014-262444.

(Continued)

*Primary Examiner* — James A Thompson
(74) *Attorney, Agent, or Firm* — Holtz, Holtz & Volek PC

(57) ABSTRACT

In an image processing apparatus, a spatial and temporal clipping standards, and a spatial and temporal combining standards are prepared. The image processing apparatus is provided with a CPU that is configured to clip plural moving images from one moving image in accordance with a spatial and/or temporal clipping standard, and combine spatially or temporally the clipped moving images with each other in accordance with a spatial and/or temporal combining standard, thereby generating a new moving image.

18 Claims, 14 Drawing Sheets

(56) References Cited

U.S. PATENT DOCUMENTS

2016/0148407 A1* 5/2016 Hodges ............... G06F 17/3028
382/309

FOREIGN PATENT DOCUMENTS

| | | | |
|---|---|---|---|
| JP | 2009147644 | A | 7/2009 |
| JP | 2010262326 | A | 11/2010 |
| JP | 2011082915 | A | 4/2011 |
| JP | 2011205383 | A | 10/2011 |
| JP | 2013017141 | A | 1/2013 |
| JP | 2013115597 | A | 6/2013 |
| JP | 2014220722 | A | 11/2014 |

OTHER PUBLICATIONS

Japanese Office Action (and English translation thereof) dated May 31, 2016, issued in counterpart Japanese Application No. 2014-262444.

Japanese Office Action (and English translation thereof) dated Feb. 23, 2016, issued in counterpart Japanese Application No. 2014-262444.

* cited by examiner

FIG.3

| THE NUMBER OF CLIPPED IMAGES | OBJECT OF HIGHEST PRIORITY | LAYOUT |
|---|---|---|
| 2 | PERSON A | LAYOUT 2A |
|  | PERSON B | LAYOUT 2B |
|  | PERSON C | LAYOUT 2C |
|  | ⋮ | ⋮ |
|  | FULL FACE | LAYOUT 2G |
|  | FACE TURNING TO THE RIGHT | LAYOUT 2H |
|  | FACE TURNING TO THE LEFT | LAYOUT 2I |
|  | ⋮ | ⋮ |
|  | NO | LAYOUT 2N |
| 3 | PERSON A | LAYOUT 3A |
|  | PERSON B | LAYOUT 3B |
|  | PERSON C | LAYOUT 3C |
|  | ⋮ | ⋮ |
|  | FULL FACE | LAYOUT 3G |
|  | FACE TURNING TO THE RIGHT | LAYOUT 3H |
|  | FACE TURNING TO THE LEFT | LAYOUT 3I |
|  | ⋮ | ⋮ |
|  | NO | LAYOUT 3N |
| ⋮ | ⋮ | ⋮ |

FIG.4A

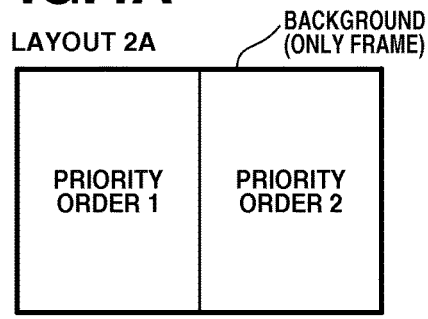

FIG.4B

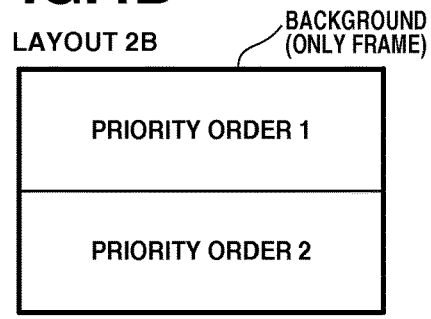

FIG.4C

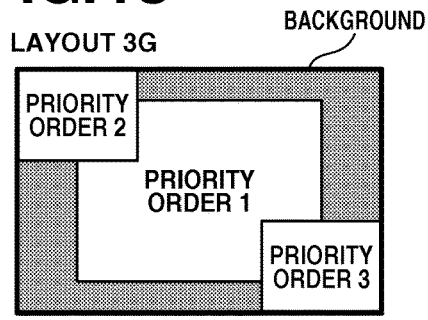

FIG.4D

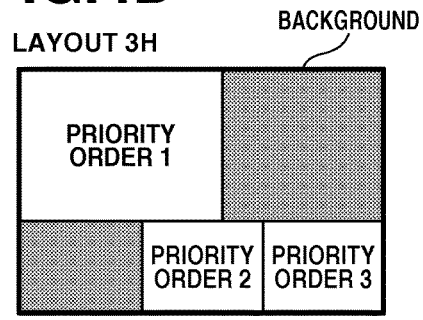

SPATIAL CLIPPING STANDARD 1 — SPATIAL CLIPPING REGION

SPATIAL CLIPPING STANDARD 1

SPATIAL CLIPPING STANDARD 2

SPATIAL CLIPPING STANDARD 2

SPATIAL CLIPPING STANDARD 3

SPATIAL CLIPPING STANDARD 3

SPATIAL CLIPPING STANDARD 4

SPATIAL CLIPPING STANDARD 4

SPATIAL CLIPPING STANDARD 4

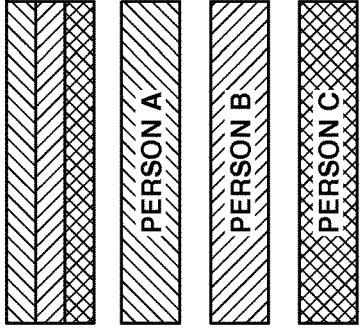
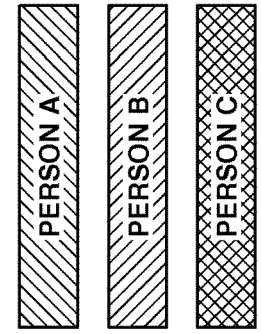
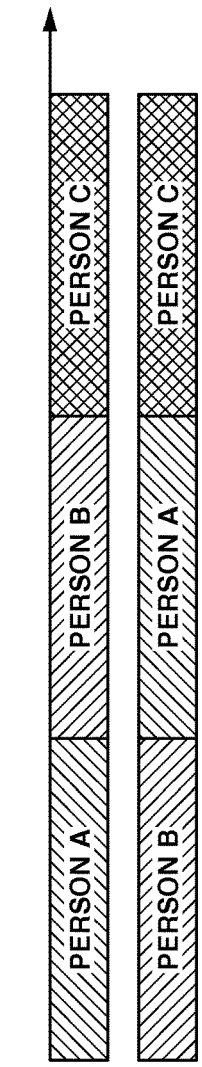
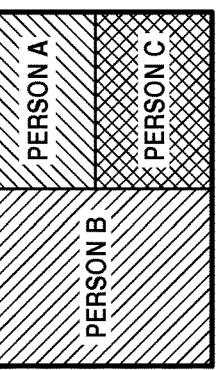
FIG.6A  ORIGINAL MOVING IMAGE
FIG.6B  CLIPPED MOVING IMAGE OF PERSON A / CLIPPED MOVING IMAGE OF PERSON B / CLIPPED MOVING IMAGE OF PERSON C
FIG.6C  TEMPORAL COMBINATION — TEMPORAL COMBINING STANDARD 1 / TEMPORAL COMBINING STANDARD 2
FIG.6D  SPATIAL COMBINATION — SPATIAL COMBINING STANDARD 1 / SPATIAL COMBINING STANDARD 2

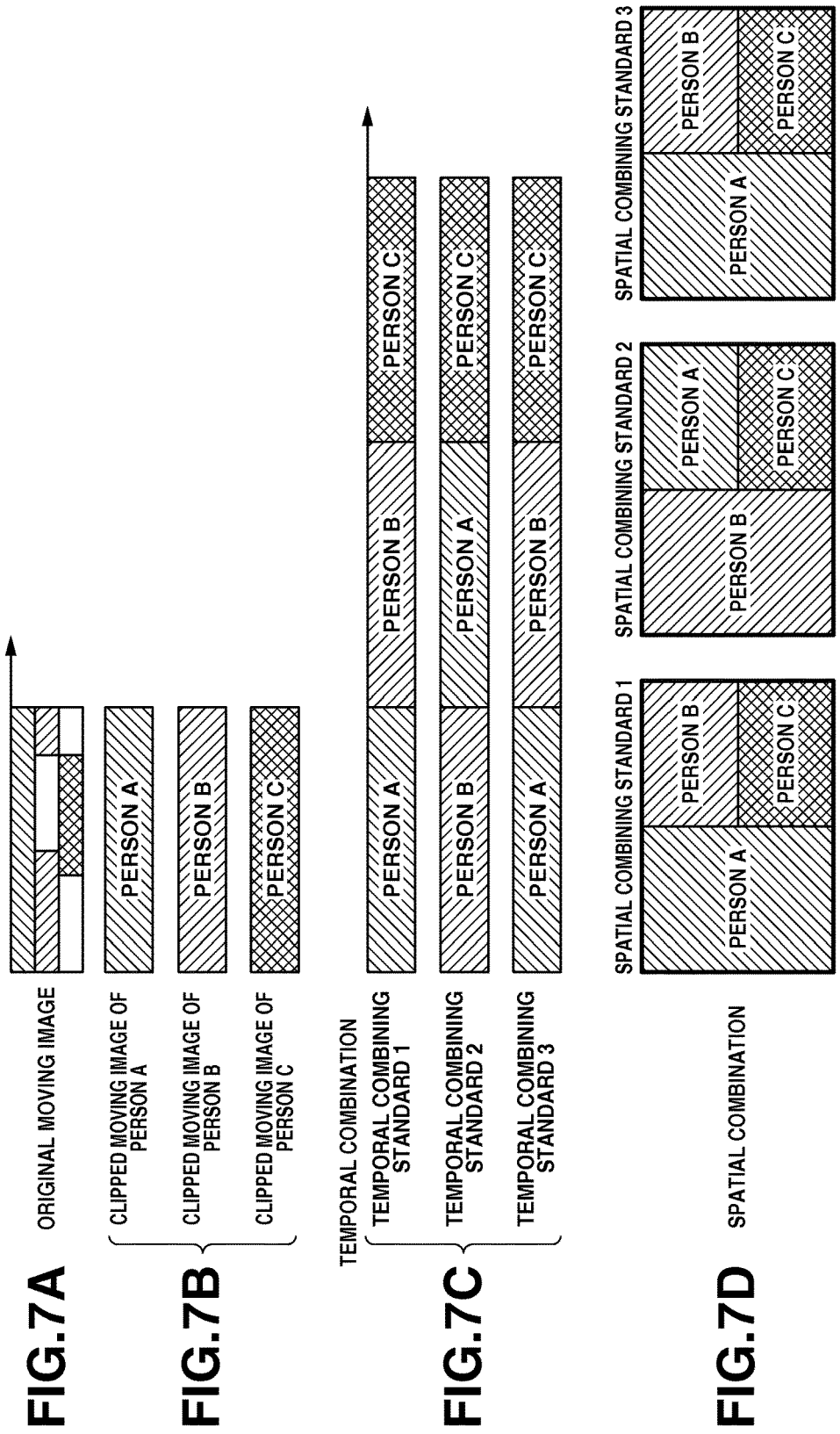

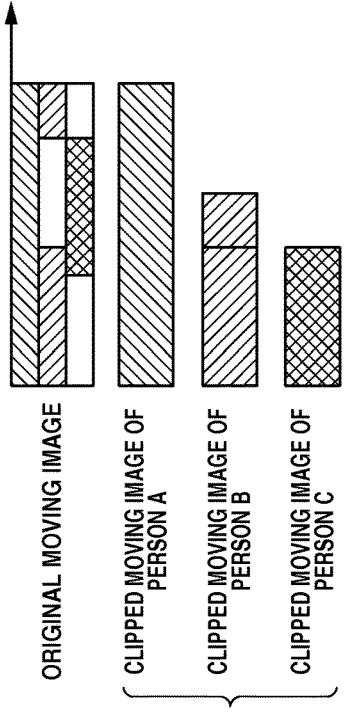
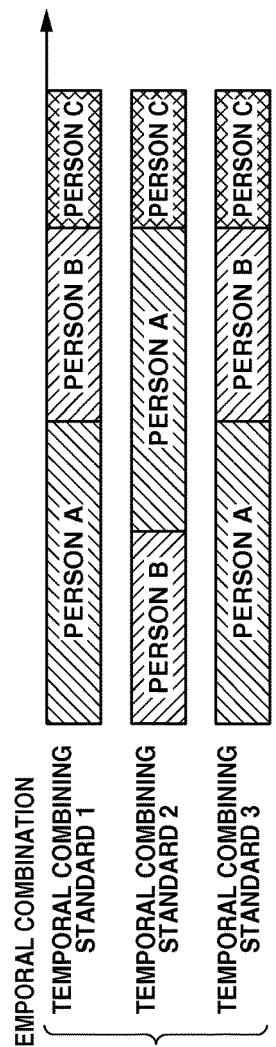
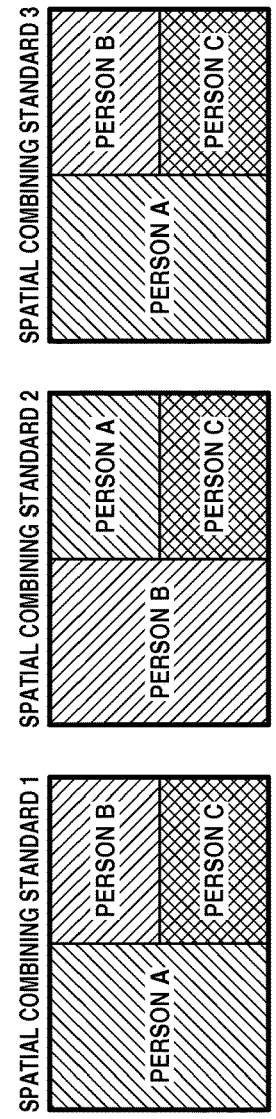
FIG.8A  ORIGINAL MOVING IMAGE
FIG.8B  CLIPPED MOVING IMAGE OF PERSON A / PERSON B / PERSON C
FIG.8C  TEMPORAL COMBINATION STANDARD 1 / STANDARD 2 / STANDARD 3
FIG.8D  SPATIAL COMBINATION

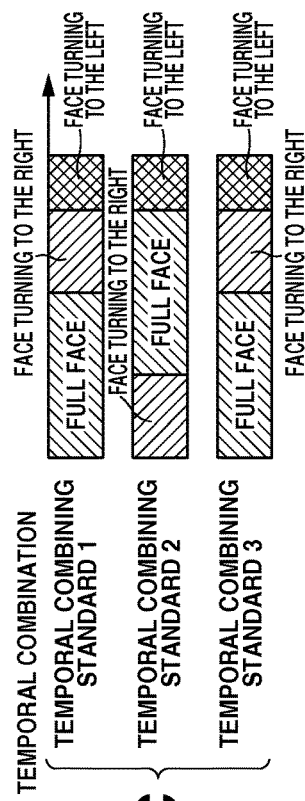
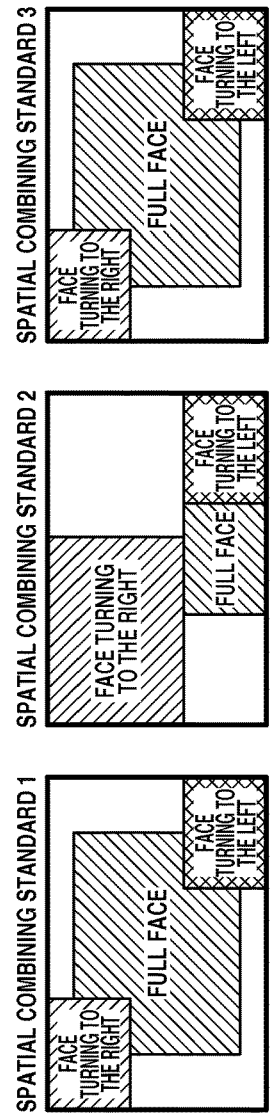
FIG.9A ORIGINAL MOVING IMAGE
FIG.9B CLIPPED MOVING IMAGE OF FULL FACE / CLIPPED MOVING IMAGE OF FACE TURNING TO THE RIGHT / CLIPPED MOVING IMAGE OF FACE TURNING TO THE LEFT
FIG.9C TEMPORAL COMBINATION STANDARD 1 / TEMPORAL COMBINATION STANDARD 2 / TEMPORAL COMBINATION STANDARD 3
FIG.9D SPATIAL COMBINATION

IMAGE PROCESSING APPARATUS FOR GENERATING A NEW MOVING IMAGE FROM A MOVING IMAGE

CROSS-REFERENCE TO RELATED APPLICATION

The present application is based upon and claims the benefit of priority from the prior Japanese Patent Application No. 2014-262444, filed Dec. 25, 2014, the entire contents of which are incorporated herein by reference.

BACKGROUND OF THE INVENTION

1. Field of the Invention

The present invention relates to an image processing apparatus and a method of processing an image.

2. Description of the Related Art

In recent, with advance in the image processing technology, such as practical use of high-pixel imaging devices and the high-resolution TV standard advanced from the Standard Television (SDTV) to High Definition Television (HDTV), it is possible to keep high image quality of a part of an image, even if such part of an image has been clipped from another image.

In the improvement of the image processing technology, Japanese Unexamined Patent Publication No. 2013-115597 has proposed a technique that traces a person to notice in a moving image and clips a portion of the person from the moving image without reducing image quality.

SUMMARY OF THE INVENTION

According to one aspect of the present invention, there is provided an image processing apparatus which comprises a CPU that is configured to clip plural moving images from one moving image in accordance with a spatial and/or temporal clipping standard, and combine spatially or temporally the clipped moving images with each other in accordance with a spatial and/or temporal combining standard, thereby generating a new moving image.

According to another aspect of the invention, there is provided an image processing apparatus which comprise a CPU that is configured to clip plural images from one image in accordance with a prescribed clipping standard; select a layout based on characteristics of the clipped images, which layout defines the number, sizes, or relative positions of plural images to be combined; and combine the plural clipped images onto the selected layout, thereby generating a new image.

According to still another aspect of the invention, there is provided a method of processing an image, which method comprises clipping plural moving images from one moving image in accordance with a spatial and/or temporal clipping standard, and combining spatially or temporally the clipped moving images with each other in accordance with a spatial and/or temporal combining standard, thereby generating a new moving image.

According to yet another aspect of the invention, there is provided a method of processing an image, which method comprises clipping plural images from one image in accordance with a prescribed clipping standard; selecting a layout based on characteristics of the clipped images, which layout defines the number, sizes, or relative positions of plural images to be combined; and combining the plural clipped images to the selected layout, thereby generating a new image.

The above aspects, novel features and advantages of the present invention will be more fully apparent from the following detailed description when the same is taken in conjunction with the accompanying drawings. It is to be expressly understood, however, that the drawings are for the purpose of illustration only and are not intended as a definition of the limits of the invention.

BRIEF DESCRIPTION OF THE DRAWINGS

The above aspects and novel features of the present invention will be more fully understood from the following detailed description when read with reference to the accompanying drawings.

FIG. 3 is a view showing an example of a layout table.

FIG. 4A to FIG. 4D are views schematically showing examples of layouts, respectively. FIG. 4A is a view schematically showing the layout 2A. FIG. 4B is a view schematically showing the layout 2B. FIG. 4C is a view schematically showing the layout 3G. FIG. 4D is a view schematically showing the layout 3H.

FIG. 5A and FIG. 5B are views schematically showing the concept of the spatial clipping standard 1. FIG. 5C and FIG. 5D are views schematically showing the concept of the spatial clipping standard 2. FIG. 5E and FIG. 5F are views schematically showing the concept of the spatial clipping standard 3. FIG. 5G, FIG. 5H and FIG. 5F are views schematically showing the concept of the spatial clipping standard 4.

FIG. 6A to FIG. 6D are views schematically showing concept of the whole image generating procedure.

FIG. 7A to FIG. 7D are views schematically showing the concept of the whole image generating procedure.

FIG. 8A to FIG. 8D are views schematically showing the concept of the whole image generating procedure.

FIG. 9A to FIG. 9D are views schematically showing the concept of the whole image generating procedure.

DETAILED DESCRIPTION OF THE PREFERRED EMBODIMENTS

The preferred embodiments of the present invention will be described with reference to the accompanying drawings in detail.

First Embodiment

Figure 1:
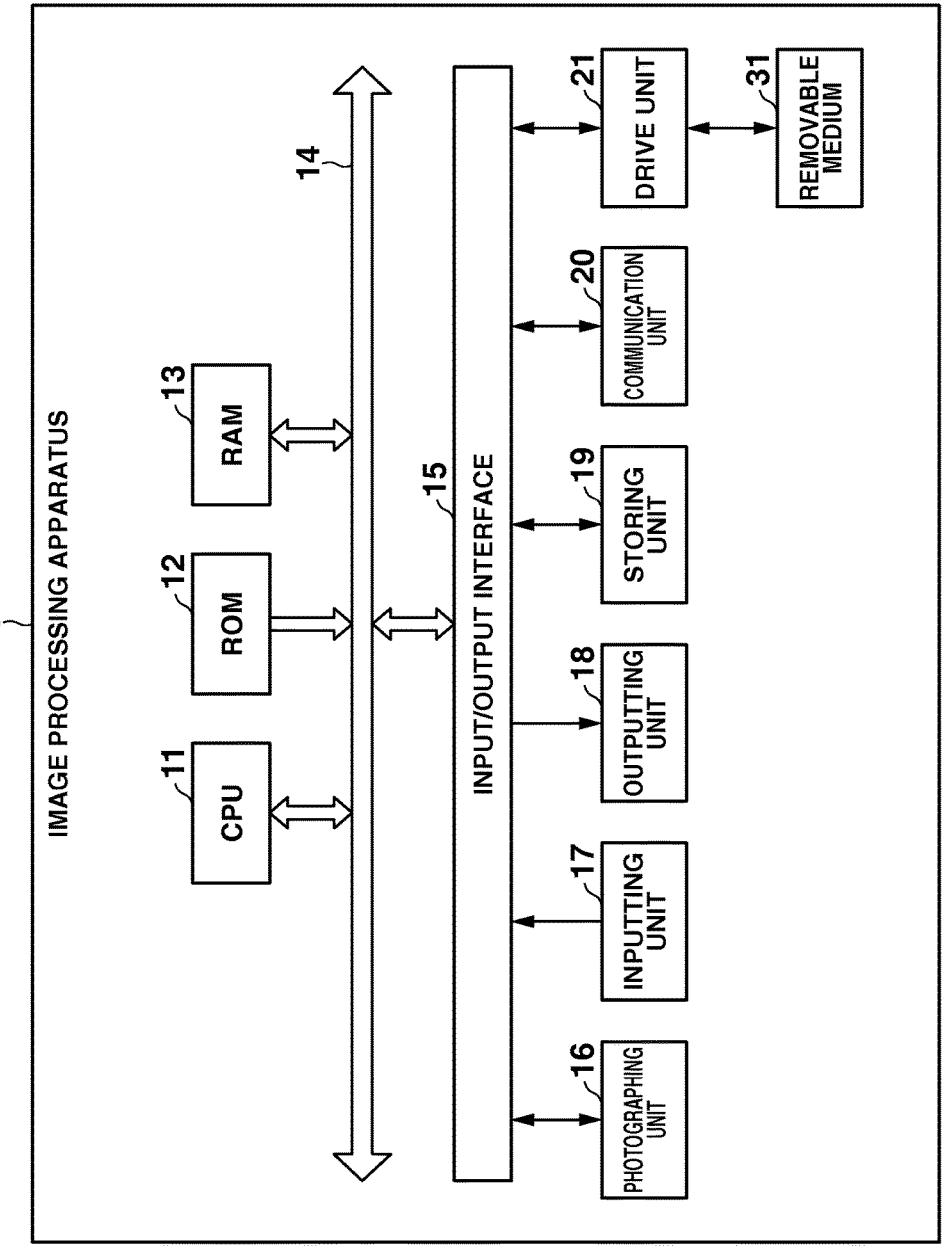
FIG. 1 is a block diagram of a hardware configuration of an image processing apparatus according to an embodiment of the invention.

FIG. 1 is a block diagram of a hardware configuration of an image processing apparatus 1 according to one embodiment of the invention.

The image processing apparatus 1 according to the present embodiment is constructed, for instance, as a digital camera.

As shown in FIG. 1, the image processing apparatus 1 comprises CPU (Central Processing Unit) 11, ROM (Read Only Memory) 12, RAM (Random Access Memory) 13, a bus 14, an input/output interface 15, a photographing unit 16, an inputting unit 17, an outputting unit 18, a storing unit 19, a communication unit 20, and a drive unit 21.

CPU 11 performs various processes in accordance with a program loaded onto RAM 13 from the storing unit 19. For instance, CPU 11 performs an image generating process in accordance with a program for an image generating process to be described later.

RAM 13 appropriately memories data required by CPU 11 to perform various processes, too.

CPU 11, ROM 12, and RAM 13 are connected to each other through the bus 14. The input/output interface 15 is connected to the bus 14. To the input/output interface 15 are connected the photographing unit 16, inputting unit 17, outputting unit 18, storing unit 19, communication unit 20, and driving unit 21.

The photographing unit 16 is provided with an optical lens unit and an image sensor (both, not shown).

The optical lens unit is composed of lens for converging light to photograph a subject, such as a focus lens and a zoom lens. The focus lens is a lens for forming a subject image on the light receiving surface of an image sensor. The zoom lens is a lens whose focal distance can be freely changed within a certain range.

The optical lens unit is provided with a peripheral circuit for adjusting parameters of setting a focal distance, an exposure time, and white balance as needed.

The image sensor is composed of a photoelectric converting element and AFE (Analog Front End).

The photoelectric converting element is composed of, for example, a photoelectric converting element of CMOS (Complementary Metal Oxide Semiconductor) type. A subject image is incident to the photoelectric converting element from the optical lens unit. The photoelectric converting element photo-electrically converts the subject image into an image signal and accumulates the image signal for a prescribed period of time, and then successively supplies the accumulated image signal as an analog signal to AFE.

AFE performs various signal processes on the analog image signal, including A/D (Analog/Digital) converting process to generate a digital signal. The photographing unit 16 outputs the generated digital signal as an output signal. Hereinafter, the output signal from the photographing unit is referred to as the "photographed image". The photographed image is supplied to CPU accordingly.

The inputting unit 17 consists of various buttons, and is operated by a user to input various sorts of information in accordance with his/her instructing operation. The outputting unit 18 consists of a displaying device for displaying images and a speaker for outputting sounds.

The storing unit 19 consists of a hard disk drive and/or a flash memory for storing data of various images.

The communication unit 20 serves to control communication with other apparatuses (not shown) through a network including the Internet.

On the drive unit 21 is detachably mounted a removable medium 31 such as a magnetic disk, optical disk, magneto-optical disk, and/or semiconductor memory. A program is read by the drive unit 21 from the removable medium 31 and is installed on the storing unit 19 as needed. The removable medium 31 stores various sorts of data such as data of images stored in the storing unit 19 in a similar manner to the storing unit 19.

Figure 2:
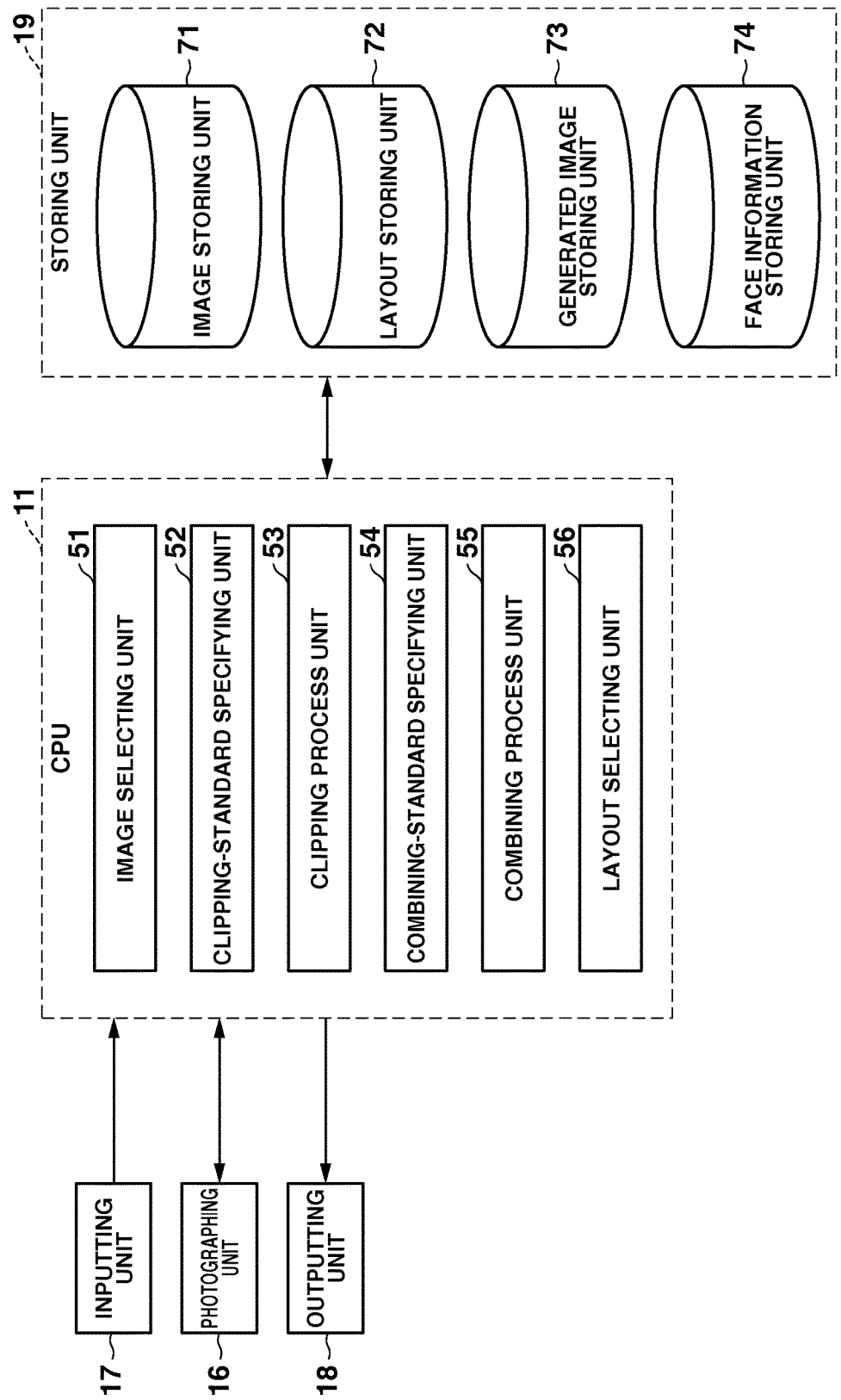
FIG. 2 is a block diagram showing a configuration for performing an image generating process among the hardware configuration of the image processing apparatus shown in FIG. 1.

FIG. 2 is a block diagram showing a configuration required for performing the image generating process in the image processing apparatus 1.

The image generating process is a series of processes. That is, in the series of processes, a face portion of each person is clipped spatially and/or temporally from one moving image in accordance with registered face information, wherein said one moving image includes plural photographed persons, and the clipped moving images of the face portions are combined with each other, whereby a new moving image is generated.

As shown in FIG. 2, when the image generating process is performed, the following units cooperate with each other functionally in CPU 11: an image selecting unit 51, a clipping-standard specifying unit 52, a clipping process unit 53, a combining-standard specifying unit 54, a combining process unit 55, and a layout selecting unit 56.

In an area of the storing unit 19 are prepared an image storing unit 71, a layout storing unit 72, a generated image storing unit 73, and a face information storing unit 74.

In the image storing unit 71, data of a moving image photographed by the image processing apparatus 1 and other apparatus is stored.

In the layout storing unit 72, data of layouts to be used when a new moving image is generated is stored and a layout table is stored, in which table conditions are defined to be referred to when a layout is selected.

FIG. 3 is a view showing an example of the layout table.

As shown in FIG. 3, the following items are associated with each other and stored in the layout table: the number of clipped images indicating the number of parts clipped from the moving image; the object of the highest priority indicating the part to which the highest priority order is given among the parts clipped from the moving image; and the associated layout.

More specifically, in the layout table shown in FIG. 3, numerals such as 2 and 3 are indicated in the item of the "number of clipped images"; "a face of person A, a face of person B, a face of person C", "a full face, a face turning to the right, a face turning to the left", "no object of the highest priority" are indicated in the term of the "object of the highest priority", and a "layout 2A, layout 2B, . . . , layout 2N, layout 3A, layout 3B, . . . , layout 3N" are indicated in the term of the "associated layout".

FIG. 4A to FIG. 4D are views schematically showing examples of the layout, respectively. FIG. 4A is a view schematically showing the layout 2A. FIG. 4B is a view schematically showing the layout 2B. FIG. 4C is a view schematically showing the layout 3G. FIG. 4D is a view schematically showing the layout 3H.

As shown in FIG. 4A to FIG. 4D, a background, the number of images to be combined with the background, and sizes and relative positions of the images are defined in each layout. When the images are combined on the whole layout as shown in the layout 2A of FIG. 4A and the layout 2B of FIG. 4B, only the frame of the background is displayed.

More specifically, composing positions are defined in the layout, at which the prescribed number of images are to be combined with the background respectively and also to which the priority orders have been set respectively. Further, sizes of the images are set to the composing positions at which the corresponding images are to be combined with the background.

For instance, the layout 2A of FIG. 4A represents that two images having the same size are combined side by side, and the priority orders of "1" and "2" are given to the left composing position and the right composing position, respectively. The layout 3G of FIG. 4C represents that 3 images are combined and a small size image is disposed at the top left corner, a large size image is disposed at the center, and a small size image is disposed at the bottom right corner, and the priority orders of "1", "2", and "3" are set to the center, the top left corner, and the bottom right corner, respectively.

In the generated image storing unit 73 shown in FIG. 2, data of a new moving image is stored, which has been generated by combining the clipped moving images in accordance with the layout.

In the face information storing area 74, authentication data for person's faces (a full face, a face turning to the right, a face turning to the left) is stored. The authentication data for person's faces is used to authenticate whether a face detected in the moving image is a specific person's face.

Well known face detecting and face authenticating techniques and processes can be applied for the process for detecting a face in the moving image and the process for authenticating whether a face detected in the moving image is a specific person's face.

The image selecting unit 51 serves to select data of a moving image satisfying the instruction input by the user among the data of images stored in the image storing unit 71. Hereinafter, the data of a moving image selected in this manner is referred to as the "original moving image".

The clipping-standard specifying unit 52 serves to specify a clipping standard referred to when a portion of a person's face is clipped from the moving image.

In the present embodiment, a spatial clipping standard and a temporal clipping standard are prepared as the clipping standards. When an image is clipped from the moving image, the clipping-standard specifying unit 52 specifies one of the spatial clipping standard and temporal clipping standard referred to last time. It is possible to the clipping-standard specifying unit 52 to accept a clipping standard specified by the user.

The spatial clipping standard and temporal clipping standard are set in the following manner.

[Spatial Clipping Standard 1]
The faces of persons are specified as the objects to be clipped, which persons are detected and authenticated as specific persons in each of the frame images composing the moving image.

[Spatial Clipping Standard 2]
The face detected and the face of a person authenticated as the specific person in each of the frame images composing the moving image are specified as the objects to be clipped.

[Spatial Clipping Standard 3]
The face of a person is not specified as the object to be clipped, which person is authenticated as the specific person in each of the frame images composing the moving image.

[Spatial Clipping Standard 4]
When a face of one person detected or a face of one person is authenticated as the specific person in each of the frame images composing the moving image, each of their full faces, each of their faces turning to the right, and each of their faces turning to the left are specified as objects to be clipped. But when plural faces have been detected or authenticated in the frame images, the authenticated face is specified as the object to be clipped prior to the detected face, depending on the priority order set for the face registered as the authenticated object and the size of the detected or authenticated face.

[Temporal Clipping Standard 1]
When a face is detected or a face is authenticated as the face of the specific person in the continuous frames composing the moving image, moving images corresponding respectively to these faces, of an equivalent time duration are clipped from the moving image regardless whether the detected face or the authenticated face is contained therein or not. But for the period of the frames in which neither the face is detected nor the face is authenticated, the original image of the same period are inserted into the clipped moving images in place thereof, whereby the both clipped moving images will contain the same number of frames.

[Temporal Clipping Standard 2]
When a face is detected or a face is authenticated as the face of the specific person in the continuous frames composing the moving image, moving images corresponding respectively to these faces, of an equivalent time duration are clipped from the moving image regardless whether the detected face or the authenticated face is contained therein or not. The moving image corresponding to the period in which neither the face is detected nor the face is authenticated is not clipped, but a temporally condensed moving image is clipped. The frame rate is reduced in the clipped moving image of a shorter time duration such that both the clipped moving image of the shorter time duration and the clipped moving image of a longer time duration will have an equivalent time duration, even though the both clipped moving images will include different number of frames.

[Temporal Clipping Standard 3]
When a face is detected or a face is authenticated as the face of the specific person in the continuous frames composing the moving image, only a moving image in the period of frames which contain the detected face and the authenticated face is clipped from the moving image to obtain a temporally condensed moving image. But the moving image is to be clipped, in the period while the face is detected or the face is authenticated and in such the period that excesses a prescribed threshold time duration. It is possible to separate the detected face and the authenticated face in terms of a full face, a face turning to the right, a face turning to the left to clip the moving image temporally.

The clipping process unit 53 performs a clipping process to clip a portion of a face of a person from the moving image based on the clipping standard specified by the clipping-standard specifying unit 52. More specifically, the clipping process unit 53 searches through the original moving image to specify an object to be clipped. The clipping process unit 53 spatially clips a rectangle area including the face of the specified person from each frame image, and temporally clips frames in a period in which the face of the specified person is contained, based on the clipping standard specified by the clipping-standard specifying unit 52. When the spatially clipped moving image is combined with other moving image(s) into a layout to be described later, a part of the clipped moving image can be cut out depending on the layout and the size and/or aspect of such clipped moving image can be changed. Therefore, when spatially clipping the object from the moving image, it is preferable for the clipping process unit 53 to clip the object with an extra space surrounding the same.

The combining-standard specifying unit 54 serves to specify a combining standard to be referred to when the moving images clipped by the clipping process unit 53 are combined with each other.

In the present embodiment, spatial combining standards and temporal combining standards are defined as the combining standard. When the moving images are combined, the combining-standard specifying unit 54 specifies one of the spatial combining standard and the temporal combining standard referred to last time. It is possible to the combining-standard specifying unit 54 to accept a combining standard specified by the user.

The spatial combining standard and temporal combining standard are set in the following manner.

[Spatial Combining Standard 1]

A layout is selected, which corresponds to the number of clipped images and the object to be clipped, having the registered highest clipping priority order, and then the clipped moving images are assigned to regions of composing positions in accordance with the priority order.

[Spatial Combining Standard 2]

A layout is selected, which corresponds to the number of clipped images and the object to be clipped, having the largest clipped size, and then the clipped moving images are assigned to the regions of the composing positions in accordance with the priority order.

[Spatial Combining Standard 3]

A layout is selected, which corresponds to the number of clipped images and the object to be clipped, having a longest clipped time duration (longest original time duration when the clipped time duration is changed), and then the clipped moving images are assigned to the regions of the composing positions in accordance with the priority order.

[Temporal Combining Standard 1]

The clipped moving images are combined in accordance with the previously registered priority order. But when plural faces have been detected or authenticated in the clipped moving image, the combining order of the authenticated face is determined prior to the detected faces, in accordance with the priority order set to the face registered as the authenticated object and the size of the detected or authenticated face.

[Temporal Combining Standard 2]

The clipped moving images are combined in accordance with the clipped size.

[Temporal Combining Standard 3]

The clipped moving images are combined in accordance with the clipped time duration (The clipped moving images are combined in accordance with the original clipped time duration with no original moving image inserted or no frame rate reduced, when the clipped time duration is changed.)

The combining process unit 55 combines the moving images clipped by the clipping process unit 53 in accordance with the combining standard specified by the combining-standard specifying unit 54. More specifically, the combining process unit 55 executes a spatial combining process to combine the clipped moving images with each other in accordance with the spatial combining standard or executes a temporal combining process to combine the clipped moving images with each other in accordance with the temporal combining standard.

The layout selecting unit 56 refers to the layout table to select layout data, based on the number of clipped images and the object of the highest priority order, when the combining process unit 55 combines the moving images spatially.

[Concept of Image Generating Procedure]

Figure 5A:
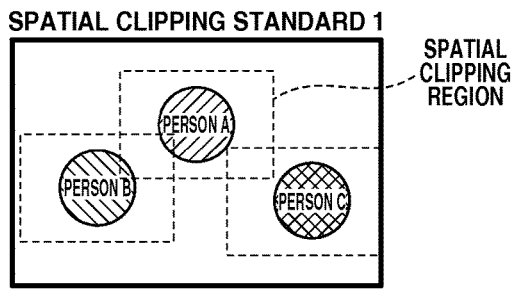
FIG. 5A to FIG. 5I are views schematically showing concept of standards for clipping images spatially.
Figure 5B:
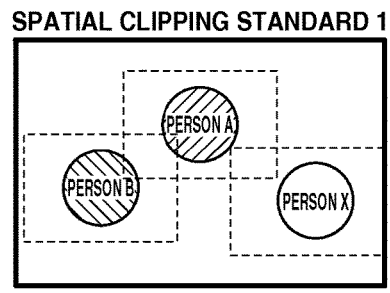
Figure 5C:
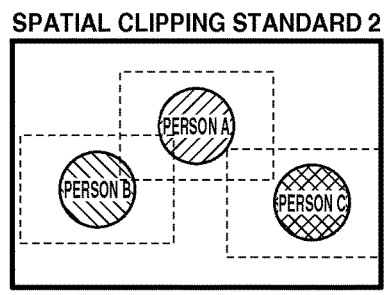
Figure 5D:
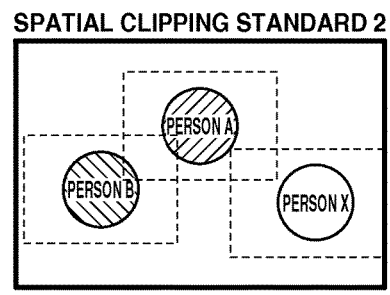
Figure 5E:
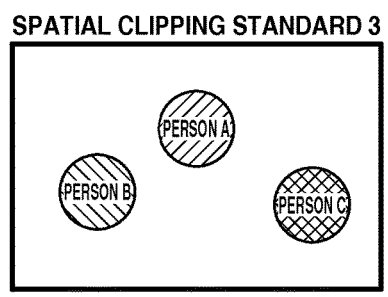
Figure 5F:
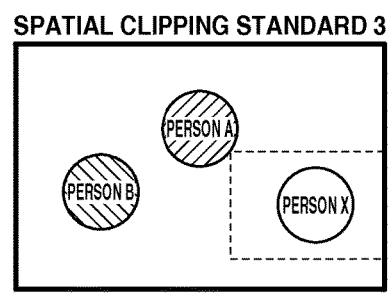
Figure 5G:
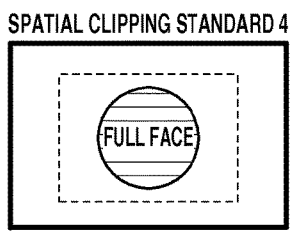
Figure 5H:
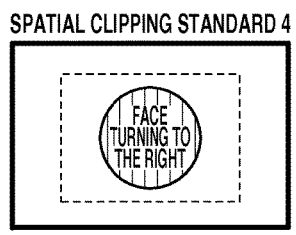

FIG. 5A to FIG. 5I are views schematically showing a concept of the standards for spatially clipping images. FIG. 5A and FIG. 5B are views schematically showing the concept of the spatial clipping standard 1. FIG. 5C and FIG. 5D are views schematically showing the concept of the spatial clipping standard 2. FIG. 5E and FIG. 5F are views schematically showing the concept of the spatial clipping standard 3. FIG. 5G, FIG. 5H and FIG. 5F are views schematically showing the concept of the spatial clipping standard 4. The dotted line in FIG. 5A to FIG. 5I indicates spatially clipping regions.

In the spatial clipping standard 1, when the faces of persons A to C authenticated as the specified persons are contained in the moving image as shown in FIG. 5A, the faces of the persons A to C will be the objects to be clipped, respectively. When the faces of the persons A and B authenticated as the specified persons and a face of the other person X are contained in the moving image as shown in FIG. 5B, then the faces of the persons A and B will be the objects to be clipped and the face of the person X will not be the object to be clipped.

In the spatial clipping standard 2, when the faces of the persons A to C authenticated as the specified persons are contained in the moving image as shown in FIG. 5C, the faces of the persons A to C will be the objects to be clipped, respectively, similarly to the case in FIG. 5A. Meanwhile, when the faces of the persons A and B authenticated as the specified persons and a face of the other person X are contained in the moving image as shown in FIG. 5D, the faces of the persons A and B and the face of the person X will be the object to be clipped.

In the spatial clipping standard 3, when the faces of the persons A to C authenticated as the specified persons are contained in the moving image as shown in FIG. 5E, the faces of the persons A to C will not be the objects to be clipped. Further, when the faces of the persons A and B authenticated as the specified persons and the face of the other person (unspecified person) X are contained in the moving image as shown in FIG. 5F, the faces of the persons A and B will not be the object to be clipped and the face of the person X will be the object to be clipped.

Figure 5I:
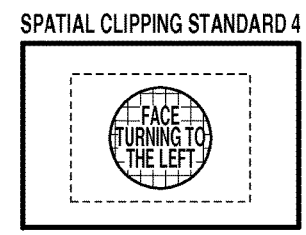

In the spatial clipping standard 4, when faces of persons authenticated as the specified persons and a face of other person are contained in the moving image as shown in FIG. 5G to FIG. 5I, the faces (its full face, face turning to the right and face turning to the left) of the highest priority order will be the objects to be clipped.

FIGS. 6A to 6D to FIGS. 9A to 9D are views schematically showing concepts of all the image generating procedures. FIGS. 6A to 6D to FIGS. 9A to 9D are views schematically explaining the concepts of generating a moving image in accordance with the temporal clipping standard and the spatial clipping standard, taking as an example of a case where moving images are clipped in accordance with the temporal clipping standard.

More specifically, FIG. 6A to FIG. 6D are views showing the case where the moving images are clipped in accordance with the temporal clipping standard 1. FIG. 7A to FIG. 7D are views showing the case where the moving images are clipped in accordance with the temporal clipping standard 2. FIG. 8A to FIG. 8D are views showing the case where the moving images are clipped in accordance with the temporal clipping standard 3 and the clipped moving images include overlapped frames. FIG. 9A to FIG. 9D are views showing the case where the moving images are clipped in accordance with the temporal clipping standard 3 and the clipped moving images include no overlapped frames.

As shown in FIG. 6A to FIG. 6D, in the temporal clipping standard 1, when the faces of the persons A, B, C authenticated as the specified persons are contained in the original moving image as shown in FIG. 6A, moving images corresponding respectively to the faces of the persons A, B, C are clipped by an equivalent time duration (Refer to FIG. 6B). In the original moving image shown in FIG. 6A, the faces of the persons A, B, C are authenticated in the whole frame period. But when a face has not been detected or authenticated in some frame periods in the original moving image as shown in FIG. 7A, the original moving image is inserted for such frame periods. Therefore, all the clipped moving images will have the same time duration, the same number of frames, and the same frame rate as the original moving image.

In the present case, it is assumed that a previously registered priority order is higher in order of the persons A, B, C, and the clipped image is larger in size in order of the persons B, A, C.

Then, when the clipped moving images are combined in accordance with the temporal combining standard 1, the clipped moving image are combined in order of the persons A, B, and C in accordance with the previously registered priority order.

Meanwhile, when the clipped moving images are combined in accordance with the temporal combining standard 2, the clipped moving image are combined in order of the persons B, A, and C in accordance with the clipped size. Further, when the clipped moving images are combined in accordance with the temporal combining standard 3, and when the clipped moving images have an equivalent time duration for the persons A, B, C, but the originally clipped moving images with no original moving image inserted are different in time duration for the persons A, B, C, like the original moving image as shown in FIG. 7A, then, the clipped moving images are combined in order of the persons A, B, C in accordance with the time duration.

When the clipped moving images are combined in accordance with the spatial combining standard 1 as shown in FIG. 6D, the image of the person A is combined to a region of a composing position of the priority order 1, the image of the person B is combined to a region of a composing position of the priority order 2, and the image of the person C is combined to a region of a composing position of the priority order 3 in accordance with the previously registered priority order. In this case, since the number of clipped images is 3 and the person A is the object of the highest clipping priority, the layout table is referred to and the layout 3A is selected.

In the meantime, when the clipped moving images are combined in accordance with the spatial combining standard 2, the image of the person B is combined to the region of the composing position of the priority order 1, the image of the person A is combined to the region of the composing position of the priority order 2, and the image of the person C is combined to the region of the composing position of the priority order 3 in accordance with the clipped size.

When the clipped moving images are combined in accordance with the spatial combining standard 3, and further, when the clipped moving images have an equivalent time duration for the persons A, B, C, but the originally clipped moving images with no original moving images inserted are different in time duration, like the original moving image shown in FIG. 7A, the clipped images are combined to the composing positions in order of the persons A, B, C in accordance with the priority order of composition. In this case, since the number of clipped images is 3 and the person B is the object of the highest clipping priority, the layout table is referred to and the layout 3B is selected.

As shown in FIG. 7A to FIG. 7D, in the temporal clipping standard 2, when the faces of the persons A, B, C authenticated as the specified persons are contained in the original moving image shown in FIG. 7A, moving images corresponding respectively to the faces of the persons A, B, C are clipped by an equivalent time duration (Refer to FIG. 7B). In the original moving image shown in FIG. 7A, the faces of the persons B, C are not authenticated in some frames. When the moving image contains a period while a face has not been detected or authenticated, the image in such period is not clipped but condensed. Therefore, the frame rate in such period is reduced lower than the original moving image to make the time duration equivalent to each other.

In the present case, it is assumed that the previously registered priority order is higher in order of the persons A, B, C, and the clipped image is larger in size in order of the persons B, A, C, and a frame rate in the clipped moving images is higher in order of the persons A, B, C (the time duration of the clipped moving image is longer in order of the persons A, B, C).

When the clipped moving images are combined in accordance with the temporal combining standard 1 as shown in FIG. 7C, the clipped moving images are combined in accordance with the previously registered priory order, and in order of the persons A, B, C.

Meanwhile, when the clipped moving images are combined in accordance with the temporal combining standard 2, the clipped moving images are combined in order of the size of the clipped image, and in order of the persons B, A, C.

Further, when the clipped moving images are combined in accordance with the temporal combining standard 3, the clipped moving images are combined in order of the persons A, B, C in order of the time duration of the originally clipped original moving image with the frame rate not reduced (the clipping time durations are equivalent).

When the clipped moving images are combined in accordance with the spatial combining standard 1 as shown in FIG. 7D, the image of the person A is combined to the region of the composing position of the priority order 1, the image of the person B is combined to the region of the composing position of the priority order 2, and the image of the person C is combined to the region of the composing position of the priority order 3 in accordance with the previously registered priority order. In this case, since the number of clipped images is 3 and the person A is the object of the highest clipping priority, the layout table is referred to and the layout 3A is selected.

Meanwhile, when the clipped moving images are combined in accordance with the spatial combining standard 2, the image of the person B is combined to the region of the composing position of the priority order 1, the image of the person A is combined to the region of the composing position of the priority order 2, and the image of the person C is combined to the region of the composing position of the priority order 3 in accordance with the size of the clipped image. In this case, since the number of clipped images is 3 and the person B is the object of the highest clipping priority, the layout table is referred to and the layout 3B is selected.

Further, when the clipped moving images are combined in accordance with the spatial combining standard 3, in order of the time duration of the originally clipped original moving image with the frame rate not reduced (the clipping time durations are equivalent), the image of the person A is combined to the region of the composing position of the priority order 1, the image of the person B is combined to the region of the composing position of the priority order 2, and the image of the person C is combined to the region of the composing position of the priority order 3. In this case, since the number of clipped images is 3 and the person A is the object of the highest clipping priority, the layout table is referred to and the layout 3A is selected.

As shown in FIG. 8A to FIG. 8D, in the temporal combining standard 3, when the faces of the persons A, B, C authenticated as the specified persons are contained in the original moving image shown in FIG. 8A, only the portions including the faces of the persons A, B, C are clipped as the moving images corresponding respectively to the faces of the persons A, B, C (Refer to FIG. 8B). In the example shown in in FIG. 8A to FIG. 8D, the frames including the faces of the persons A, B, C overlap temporally in the original moving image. In the original moving image shown in FIG. 8A, the faces of the persons B, C are not authenticated in some frames. When the original moving image includes the frame period in which the faces of the persons B, C are not authenticated, the time duration of the clipped moving images including the faces of the persons B, C will be less than the original moving image.

In the present case, it is assumed that the previously registered priority order is higher in order of the persons A, B, C, and the clipped image is larger in size in order of the persons B, A, C, and the time duration of the clipped moving image is longer in order of the persons A, B, C.

When the clipped moving images are combined in accordance with the temporal combining standard 1 as shown in FIG. 8C, the clipped moving images are combined in accordance with the previously registered priory order, and in order of the persons A, B, C.

Meanwhile, when the clipped moving images are combined in accordance with the temporal combining standard 2, the clipped moving images are combined in order of the size of the clipped image, and in order of the persons B, A, C.

Further, when the clipped moving images are combined in accordance with the temporal combining standard 3, the clipped moving images are combined in order of the clipping time duration, and in order of the persons A, B, C.

When the clipped moving images are combined in accordance with the spatial combining standard 1 as shown in FIG. 8D, the image of the person A is combined to the region of the composing position of the priority order 1, the image of the person B is combined to the region of the composing position of the priority order 2, and the image of the person C is combined to the region of the composing position of the priority order 3 in accordance with the previously registered priority order. In this case, since the number of clipped images is 3 and the person A is the object of the highest clipping priority, the layout table is referred to and the layout 3A is selected.

Meanwhile, when the clipped moving images are combined in accordance with the spatial combining standard 2, the image of the person B is combined to the region of the composing position of the priority order 1, the image of the person A is combined to the region of the composing position of the priority order 2, and the image of the person C is combined to the region of the composing position of the priority order 3 in accordance with the size of the clipped image. In this case, since the number of clipped images is 3 and the person B is the object of the highest clipping priority, the layout table is referred to and the layout 3B is selected.

Further, when the clipped moving images are combined in accordance with the spatial combining standard 3, in order of the time duration of the clipped moving image, the image of the person A is combined to the region of the composing position of the priority order 1, the image of the person B is combined to the region of the composing position of the priority order 2, and the image of the person C is combined to the region of the composing position of the priority order 3. In this case, since the number of clipped images is 3 and the person A is the object of the highest clipping priority, the layout table is referred to and the layout 3A is selected.

As shown in FIG. 9A to FIG. 9D, in the temporal combining standard 3, when the face (a full face, face turning to the right, face turning to the left) of the person authenticated as the specified person is contained in the original moving image shown in FIG. 9A, only the portions including the faces (full face, face turning to the right, face turning to the left) of the person are clipped as the moving images corresponding respectively to the respective faces of the person (Refer to FIG. 9B). In the original moving image shown in FIG. 9A, the face of the person is authenticated in the whole frame period, and the frames including the faces (full face, face turning to the right, face turning to the left) of the person do not overlap temporally in the original moving image. Therefore, the total time duration of the clipped moving images will be equivalent to the original moving image.

In the present case, it is assumed that the previously registered priority order is higher in order of the full face, the face turning to the right and the face turning to the left, the clipped image is larger in size in order of the face turning to the right, the full face, and the face turning to the left, and the time duration of the clipped moving image is longer in order of the full face, the face turning to the right and the face turning to the left.

When the clipped moving images are combined in accordance with the temporal combining standard 1 as shown in FIG. 9C, the clipped moving images are combined in accordance with the previously registered priory order, and in order of the full face, the face turning to the right and the face turning to the left.

Meanwhile, when the clipped moving images are combined in accordance with the temporal combining standard 2, the clipped moving images are combined in order of the size of the clipped image, and in order of the face turning to the right, the full face, and the face turning to the left.

Further, when the clipped moving images are combined in accordance with the temporal combining standard 3, the clipped moving images are combined in order of the clipping time duration, and in order of the full face, the face turning to the right and the face turning to the left.

When the clipped moving images are combined in accordance with the spatial combining standard 1 as shown in FIG. 9D, in accordance with the previously registered priority order, the image of the full face is combined to the region of the composing position of the priority order 1, the image of the face turning to the right is combined to the region of the composing position of the priority order 2, and the image of the face turning to the left is combined to the region of the composing position of the priority order 3. In this case, since the number of clipped images is 3 and the full face is the object of the highest clipping priority, the layout table is referred to and the layout 3G is selected.

Meanwhile, when the clipped moving images are combined in accordance with the spatial combining standard 2, in accordance with the size of the clipped image, the image of the face turning to the right is combined to the region of the composing position of the priority order 1, the image in full face is combined to the region of the composing position of the priority order 2, and the image of the face turning to the left is combined to the region of the composing position of the priority order 3. In this case, since the number of clipped images is 3 and the face turning to the right is the object of the highest clipping priority, the layout table is referred to and the layout 3H is selected.

Further, when the clipped moving images are combined in accordance with the spatial combining standard 3, in order of the time duration of the clipped moving image, the image of the full face is combined to the region of the composing position of the priority order 1, the image of the face turning to the right is combined to the region of the composing position of the priority order 2, and the image of the face turning to the left is combined to the region of the composing position of the priority order 3. In this case, since the number of clipped images is 3 and the full face is the object of the highest clipping priority, the layout table is referred to and the layout 3G is selected.

Now, the operation of the image processing apparatus 1 will be described in detail.

[Image Generating Process]

Figure 10:
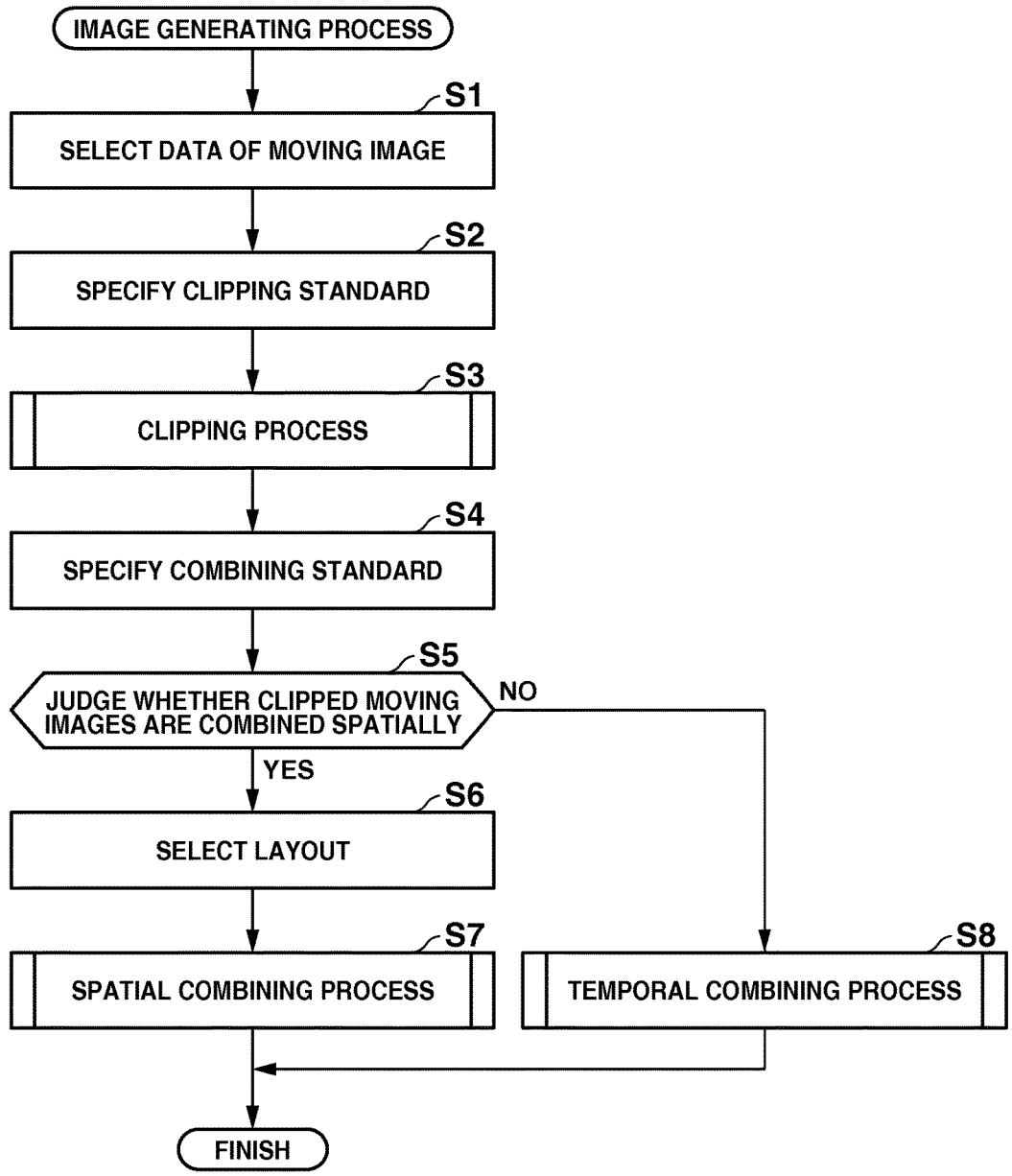
FIG. 10 is a flowchart of the image generating process performed by the image processing apparatus shown in FIG. 1, which comprises the configuration shown in FIG. 2.

FIG. 10 is a flowchart of the image generating process performed by the image processing apparatus 1, which comprises the configuration shown in FIG. 2. The image processing process starts when the user operates the inputting unit 17 to start the image processing process.

The image selecting unit 51 selects data of the moving image corresponding to the instruction entered by the user out of data of images stored in the image storing unit 71 (step S1 in FIG. 10). The selected data of the moving image is used as the original moving image.

The clipping-standard specifying unit 52 specifies the clipping standard which is referred to, when a portion of the face of a person is clipped from the moving image (step S2). The clipping standard selected last time will be specified as the clipping standard to be used this time. But the user is allowed to operate the inputting unit 17 to specify another clipping standard.

The clipping process unit 53 performs a clipping process of clipping the portion of the face of a person from the moving image in accordance with the clipping standard specified by the clipping-standard specifying unit 52 (step S3). The clipping process will be described later in detail.

The combining-standard specifying unit 54 specifies the combining standard which is referred to, when the moving images clipped by the clipping process unit 53 are combined to each other (step S4). The combining standard selected last time will be specified again, but the user is allowed to operate the inputting unit 17 to specify another combining standard.

The combining process unit 55 judges based on the combining standard specified at step S4 by the combining-standard specifying unit 54, whether the clipped moving images are combined spatially (step S5). When it is determined that the clipped moving images are not combined spatially (NO at step S5), the process advances to step S8. Meanwhile, when it is determined that the clipped moving images are combined spatially (YES at step S5), then the process advances to step S6.

The layout selecting unit 56 refers to the layout table based the number of images clipped in the clipping process at step S3 and the object of the highest clipping priority, and selects layout data based on the combining standard specified at step S4 (step S6).

The combining process unit 55 performs a spatial combining process to combine the clipped moving images in accordance with the spatial combining standard (step S7). The spatial combining process will be described later in detail.

The combining process unit 55 performs a temporal combining process to combine the clipped moving images in accordance with the temporal combining standard (step S8). The temporal combining process will be described later in detail. When the process has been finished at step S7 or step S8, then the image generating process finishes finally.

[Clipping Process]

Figure 11:
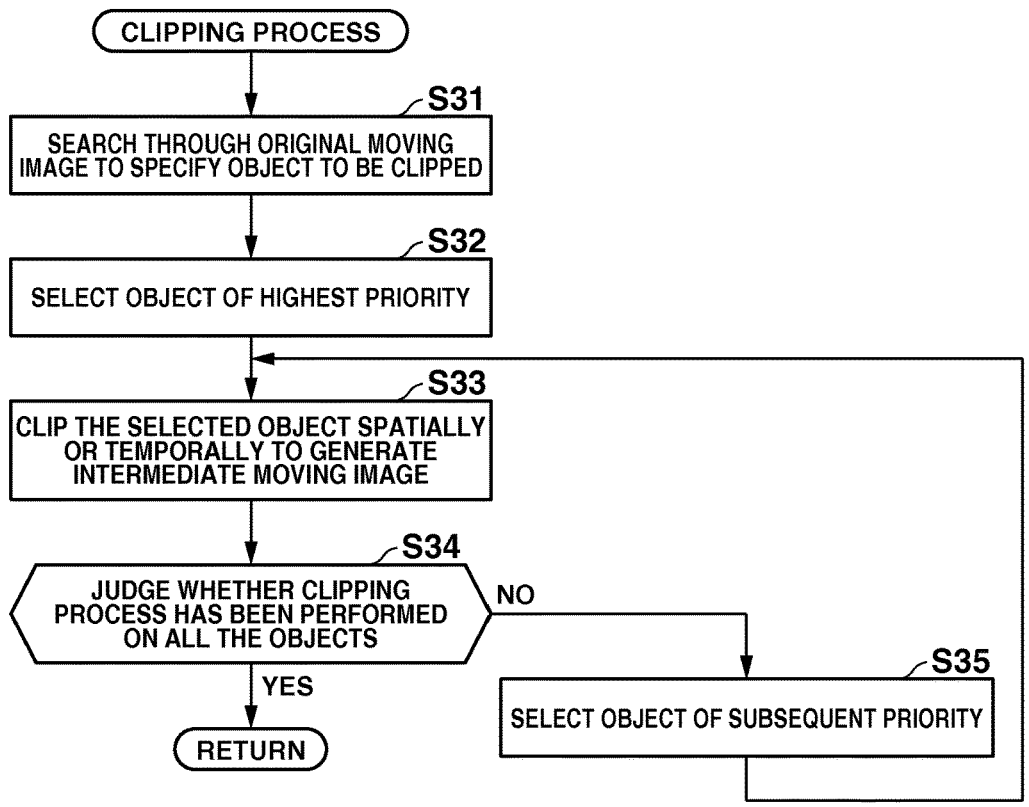
FIG. 11 is flow chart of a clipping process performed at step S3 in FIG. 10.

FIG. 11 is a flow chart of the clipping process performed at step S3 in the flow chart of FIG. 10.

The clipping process unit 53 searches through the original moving image to specify an object to be clipped (step S31 in FIG. 11).

Based on the specified spatial clipping standard or temporal clipping standard, the clipping process unit 53 selects the object of the highest priority as a subject to be processed (step S32).

The clipping process unit 53 spatially or temporally clips the moving image of the selected object to generate an intermediate moving image (step S33). The intermediate moving image is a temporarily stored collection of frame data in an unspecified file format.

The clipping process unit 53 judges whether the clipping process has been executed on all the objects to be clipped (step S34). When it is determined at step S34 that the clipping process has not been executed on all the objects to be clipped (NO at step S34), the process advances to step S35.

The clipping process unit 53 selects the object of the subsequent priority as the subject to be processed (step S35), and returns to step S33.

Meanwhile, when it is determined at step S34 that the clipping process has been executed on all the objects to be clipped (YES at step S34), the process returns to the image generating process of FIG. 10.

[Spatial Combining Process]

Figure 12:
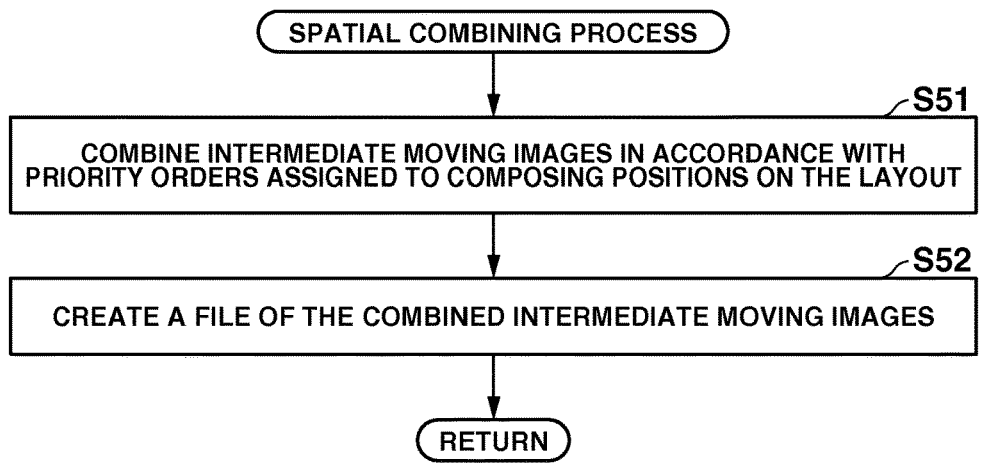
FIG. 12 is a flow chart of a spatial combining process performed at step S7 in FIG. 10.

FIG. 12 is a flowchart of the spatial combining process performed at step S7 in the flow chart of FIG. 10.

The combining process unit 55 combines the intermediate moving images (intermediate moving images adjusted in size and aspect ratio) corresponding to the priority orders defined respectively for the composing positions in the selected layout in accordance with the layout (step S51 in FIG. 12).

The combining process unit 55 creates a file of the intermediate moving images combined step S51 (step S52). In the present embodiment, the file format used for the files of the moving image is in conformity with MPEG (Moving Picture Experts Group) 4, H264 or H265.

When the process has been finished at step S52, the process returns to the image generating process of FIG. 10.

[Temporal Combining Process]

Figure 13:
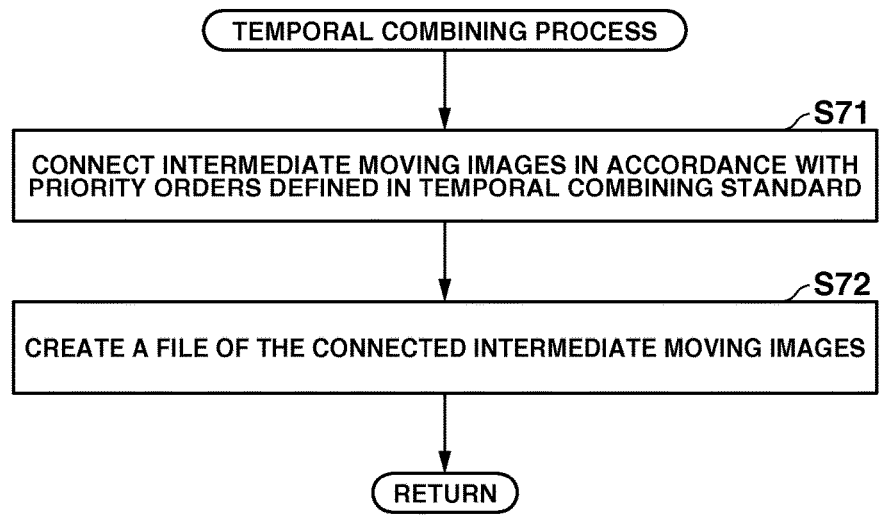
FIG. 13 is a flowchart of a temporal combining process performed at step S8 in FIG. 10.

FIG. 13 is a flow chart of the temporal combining process performed at step S8 in the flow chart of FIG. 10.

The combining process unit 55 connects the intermediate moving images together in order of the priority order defined in the specified temporal combining standard (step S71 in FIG. 13).

The combining process unit 55 creates a file of a the intermediate moving images connected together at step S71

(step S72). When the process has been finished at step S72, the process returns to the image generating process of FIG. 10.

In the image processing apparatus 1 described above, even though plural persons are included as the objects in the moving image (original moving image) selected by the user, plural moving images are clipped in accordance with the spatial clipping standard or the temporal clipping standard. The plural clipped moving images are combined with each other in order of priority in accordance with the spatial combining standard or the temporal combining standard, whereby a new moving image is generated.

Even if the plural persons appear at separate positions in the image, the mage of each of the persons is clipped from the moving image and the clipped images are combined into a new single moving image. Therefore, regardless of the positions of the plural persons in the image, a fine image of these plural persons can be obtained.

The objects are clipped from the moving image in accordance with the spatial clipping standard, and the clipped objects are combined in accordance with the temporal combining standard, whereby a new moving image can be generated. Therefore, it is possible to temporally and continuously display the photographed objects who are standing separately in the moving image, so as to meet a previously set standard.

The objects are clipped from the moving image in accordance with the temporal clipping standard, and the clipped objects are combined in accordance with the spatial combining standard, whereby a new moving image can be generated. Therefore, no matter whether or not the plural objects simultaneously photographed in the same moving image, it is possible to display the plural objects spatially disposed in the moving image, so as to meet a previously set standard.

In the present embodiment, although the example in which the objects are clipped from the moving image has been described, it is possible to clip the objects from plural still images and/or continuous still images in addition to the moving image.

Second Embodiment

The image processing apparatus according to the second embodiment of the invention will be described in detail.

In the image processing apparatus 1 according to the second embodiment, the objects are spatially clipped from a still image and the clipped still images are spatially combined to generate a new still image.

In other words, the image processing apparatus 1 according to the second embodiment comprises substantially the same hardware configuration as the first embodiment but performs an image generating process which is different in content from the first embodiment.

Figure 14:
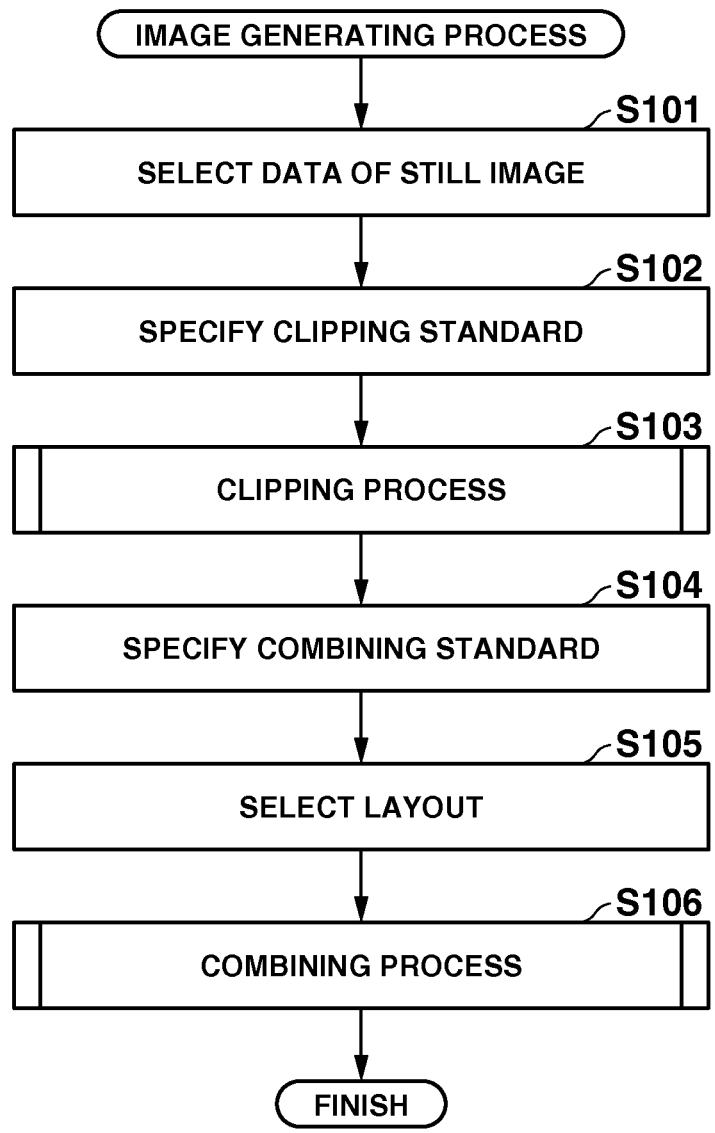
FIG. 14 is a flowchart of the image generating process performed in the image processing apparatus according to the second embodiment of the invention.

FIG. 14 is a flow chart of the image generating process performed in the image processing apparatus 1 according to the second embodiment. The image processing process starts when the user operates the inputting unit 17 to start the image processing process.

The image selecting unit 51 selects data of a still image corresponding to the instruction entered by the user out of data of images stored in the image storing unit 71 (step S101 in FIG. 14). The selected data of the still image is referred to as the "original still image".

The clipping-standard specifying unit 52 specifies the clipping standard (spatial clipping standard) which is referred to, when a portion of the face of a person is clipped from the still image (step S102). In the present second embodiment, any one of the spatial clipping standards 1, 2, 3 is specified out of the spatial clipping standards 1, 2, 3, 4 used in the first embodiment. In a similar manner to the first embodiment, the clipping standard selected last time is specified as the clipping standard to be used this time. But the user is allowed to operate the inputting unit 17 to specify another clipping standard.

The clipping process unit 53 performs the clipping process of clipping a portion of the face of a person from the still image in accordance with the clipping standard specified by the clipping-standard specifying unit 52 (step S103). The clipping process will be described later in detail.

The combining-standard specifying unit 54 specifies the combining standard (spatial combining standard) which is referred to, when the still images clipped by the clipping process unit 53 are combined with each other (step S104). In the present second embodiment, any one of the spatial combining standards 1, 2 is specified out of the spatial combining standards 1, 2, 3 used in the first embodiment. In a similar manner to the first embodiment, the combining standard selected last time is specified as the combining standard to be used this time. But the user is allowed to operate the inputting unit 17 to specify another combining standard.

The layout selecting unit 56 refers to the layout table based the number of images clipped in the clipping process at step S103 and the object of the highest clipping priority and selects layout data based on the combining standard specified at step S104 (step S105).

The combining process unit 55 performs a combining process to combine the clipped still images in accordance with the spatial combining standard (step S106). The combining process will be described later in detail.

When the process has been finished at step S106, then the image generating process finishes finally.

[Clipping Process]

Figure 15:
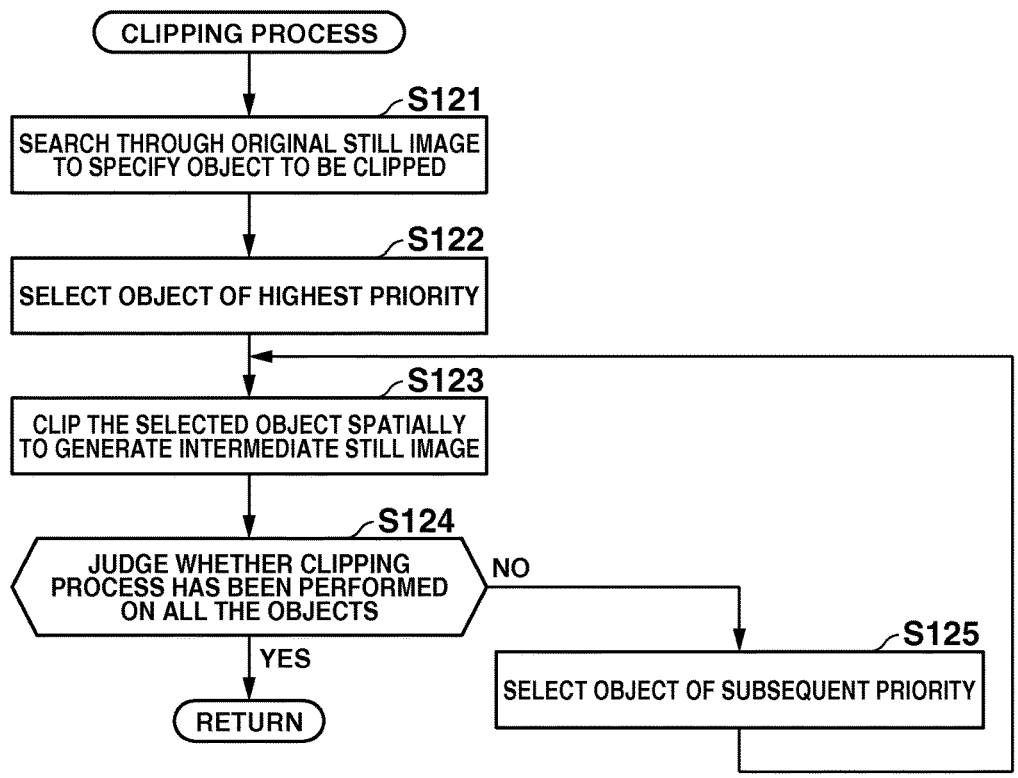
FIG. 15 is a flow chart of the clipping process performed at step S103 in FIG. 14.

FIG. 15 is a flow chart of the clipping process performed at step S103 in the flow chart of FIG. 14.

The clipping process unit 53 searches through the original still image to specify an object to be clipped (step S121 in FIG. 15).

The clipping process unit 53 selects the object of the highest priority as a subject to be processed based on the specified spatial clipping standard (step S122).

The clipping process unit 53 spatially clips the still image of the selected object to generate an intermediate still image (step S123). The intermediate still image is a temporarily stored collection of pixel data in an unspecified file format.

The clipping process unit 53 judges whether the clipping process has been executed on all the objects to be clipped (step S124). When it is determined at step S124 that the clipping process has not been executed on all the objects to be clipped (NO at step S124), the process advances to step S125.

The clipping process unit 53 selects the object of the subsequent priority order as the subject to be processed (step S125), and returns to step S123.

Meanwhile, when it is determined at step S124 that the clipping process has been executed on all the objects to be clipped (YES at step S124), the process returns to the image generating process of FIG. 14.

[Combining Process]

Figure 16:
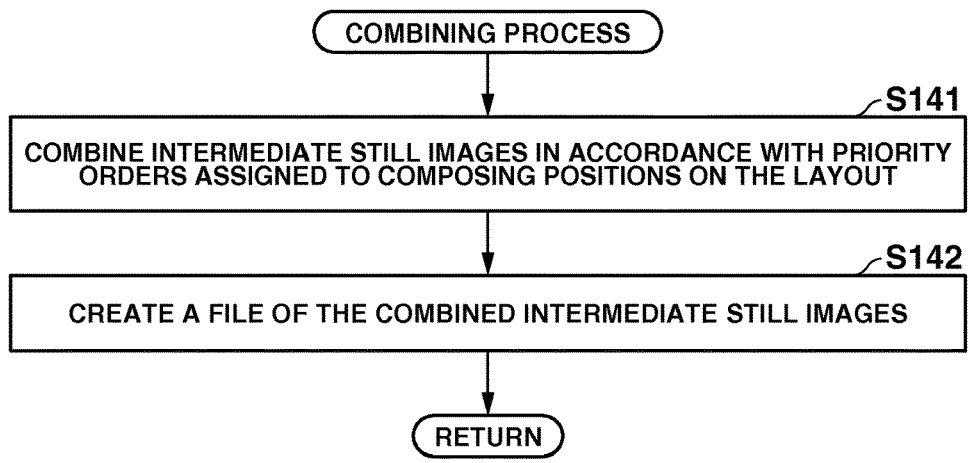
FIG. 16 is a flow chart of the combining process performed at step S106 in FIG. 14.

FIG. 16 is a flow chart of the combining process performed at step S106 in the flow chart of FIG. 14.

The combining process unit 55 combines the intermediate still images (intermediate still images adjusted in size and aspect ratio) corresponding to the priority orders defined respectively for the composing positions in the selected layout in accordance with the layout (step S141).

The combining process unit 55 creates a file of the combined intermediate still images (step S142). In the present embodiment, the file format used for the file of the moving image is in conformity with JPEG (Joint Photographic Experts Group) or GIF (Graphic Interchange Format).

When the process has been finished at step S142, the process returns to the image generating process of FIG. 14.

In the second embodiment described above, even though plural persons are included as the objects in the still image selected by the user, plural images are clipped from the still image in accordance with the spatial clipping standard. The plural clipped images are combined with each other in order of priority in accordance with the spatial combining standard, whereby a new still image is generated.

Even if the plural persons appear at separate positions in the still image, the mage of each person is clipped from the still image and the clipped images are combined into a new single still image. Therefore, regardless of the positions of the plural persons in the image, a fine image of these plural persons can be obtained.

Another Example

In the second embodiment, the example has been explained, in which when the objects such as the faces of persons are clipped spatially, each of the objects is clipped separately. Contrarily, when the objects such as the faces of persons are clipped spatially, it is possible to collect plural objects locating closely together on the image and to clip the plural collected objects together.

Figure 17:
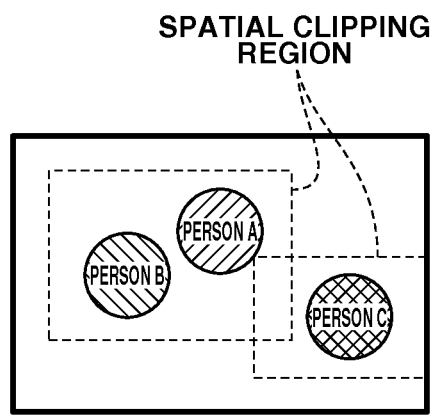
FIG. 17 is a view showing the concept of spatially clipping plural objects together.

FIG. 17 is a view schematically showing a concept of a process of spatially clipping plural objects collectedly.

In a frame of the moving image or a still image shown in FIG. 17, the faces of the persons A, B, C authenticated as the specified persons are contained, and the faces of the persons A, B appear within a threshold range. In this case, it is possible to spatially clip the faces of the persons A, B together or collectedly by clipping an area (surrounded by a dotted line) including the faces of the persons A, B.

When the both faces of the persons are clipped in the above manner, the objects having a high spatial relativity can be clipped without being separated from each other. A new image can be generated, which represents proper relationship between the objects.

The image processing apparatus 1 having the above feature is provided with the clipping process unit 53 and the combining process unit 55.

The clipping process unit 53 serves to clip plural moving images from one moving image in accordance with the spatial and/or temporal clipping standard. The combining process unit 55 serves to combine the plural clipped moving images spatially or temporally in accordance with the spatial and/or temporal combining standard to generate a new moving image.

In this manner, a new moving image can be generated in accordance with the spatial and/or temporal combining standard from the plural moving images, which have been clipped in accordance with the spatial and/or temporal clipping standard.

Therefore, even though plural objects appear at separate positions in the image, each of the objects is clipped separately and appropriately from the moving image and the clipped plural moving images are combined again, whereby a new single moving image can be generated. As a result, regardless of the spatial relativity between the plural objects on the image, a substantially ideal moving image can be generated.

The combining process unit 55 serves to combine in accordance with the temporal combining standard the plural moving images, which have been clipped in accordance with the spatial clipping standard, whereby it is possible to continuously display the objects standing at separate positions in the moving image so as to satisfy a previously set combining standard.

The combining process unit 55 serves to combine in accordance with the spatial combining standard the plural moving images, which have been clipped in accordance with the temporal clipping standard, whereby no matter whether or not the objects appear simultaneously in the moving image, it is possible to combine the clipped moving images so as to satisfy a previously set combining standard to display the plural objects spatially disposed in the moving image.

The clipping process unit 53 serves to spatially clip a predetermined portion of the object contained in each of the images composing the moving image in accordance with the spatial clipping standard, whereby it is possible to clip a region of the predetermined object in each of the images of the moving image.

The clipping process unit 53 serves to temporally clip frames including a predetermined object from the frames composing the moving image in accordance with the temporal clipping standard, whereby moving image of a frame period including the predetermined object can be clipped from the moving image.

The predetermined objects are the faces of the previously registered persons. Even though plural previously registered persons standing separately appear in the moving image, each of the objects can be properly clipped from the moving image.

Further, the predetermined objects include the face of an unspecified person. Even though the face of the unspecified person appears in the moving image, plural persons can be properly clipped from the moving image.

A face of a person other than the person whose face is to be clipped by the clipping process unit 53 is previously registered, whereby a moving image can be generated with a specific person removed from the plural persons appearing in the moving image.

An image is spatially divided into plural regions and the priority orders are given to the regions respectively. The combining process unit 55 assigns the clipped moving images to the regions according to the priority order of the region in accordance with the spatial combining standard, whereby a moving image can be generated from the clipped moving images depending on the priority orders of the clipped moving images corresponding to the spatial priority orders given to the regions.

The image processing apparatus 1 having the above feature is provided with the layout selecting unit 56.

The layout selecting unit 56 selects the layout which corresponds to the number of clipped moving images or the number of plural images of the objects included in the image, and defines sizes of the image-composing regions and their spatial relative positions.

The combining process unit 55 combines the clipped images onto the selected layout, thereby generating a new image.

In this way, it is possible to automatically combine the clipped moving images to the layout, generating a new moving image.

The combining process unit 55 temporally connects the clipped moving images in order of the priority in accordance with the temporal combining standard, whereby a new moving image is generated, in which plural moving images of the objects are connected to each other in order of the priority order.

The priority order is defined depending on the previously registered priority orders of the objects included in the image, the spatial sizes of the clipped objects, and/or the time durations of the clipped moving images, whereby an appropriate priority order can be set depending on the attributes of the clipped moving images.

The image processing apparatus 1 having the above features is provided with the clipping process unit 53, the layout selecting unit 56, and the combining process unit 55.

The clipping process unit 53 clips plural images from one image in accordance with the spatial clipping standard.

The layout selecting unit 56 selects based on the characteristics of the clipped images one layout which defines the number and sizes of images to be combined together, and the spatial relationship between them.

The combining process unit 55 combines the plural clipped images to the selected layout to generate a new image, whereby one image or moving image can be generated in accordance with the spatial combining standard from the plural images clipped in accordance with the spatial clipping standard.

Therefore, even if the plural objects are separate in a still image, it is possible to clip each of the objects from the still image to combine them into a new still image or moving image. As described, regardless of the positions of the plural objects in the image, a fine still image or moving image of these objects can be obtained.

The invention will not be limited to the particular embodiments described above, but modifications and rearrangements may be made to the disclosed embodiments while the purpose of the invention can be realized.

In the embodiments described above, the faces of the persons have been described as the objects to be clipped, but the objects are not limited to the faces of the persons. Other part of a person can be the object to be clipped and further other living thing and/or an article may be the object to be clipped as far as they can be authenticated or detected in the image.

In the embodiments described above, it is possible to combine the images clipped from the original still image or moving image to generate a new still image or moving image of the same size or aspect ratio as the original still image or moving image or of another size or aspect ratio.

In the embodiments described above, the layout has been described, as a sort of an arrangement plan which defines the background, the number and sizes of images to be disposed on the background, and the relative positions of the images to be disposed on the background, but the layout is not limited to the above arrangement plan. In the layout, all the items such as the background, the number and sizes of images to be disposed on the background, and the relative positions of the images are not always defined, but another item in addition to the above items can be defined in the layout.

In the embodiments described above, the image generating process is performed on the image data stored in the image storing unit 71, but it is possible to perform the image generating process on a still image and/or moving image photographed by the photographing unit 17.

In the embodiments described above, a face of one person detected or a face of one person authenticated as the specified person in the moving image, and its full face, face turning to the right, and face turning to the left are employed respectively as the objects to be clipped in the spatial clipping standard 4. But a smile face, anger face, tear-stained face of one person detected or one person authenticated as the specified person in the moving image will be the object to be clipped.

In the embodiments described above, various kinds of arrangement plans will be employed as the layouts to be used, as far as they can be used for combining the clipped plural images. For instance, a layout having a function of PinP (Picture in Picture) can be used as the layout used in the image processing apparatus 1 according to the present invention.

In the above description, the image processing apparatus 1 according to the invention has been explained as the digital camera. But the image processing apparatus is not limited to the digital camera. For example, the present invention can be applied to a general electronic apparatus with the image processing function, such as a note-type personal computer, printer, TV receiver, video camera, portable navigation apparatus, cellar phone, smart phone, portable game machine, and so on.

The series of processes can be performed by hardware and also by software. In other words, the configuration of the image processing apparatus 1 is shown as an example in FIG. 2. It will be enough for the image processing apparatus 1 if the apparatus 1 is provided with a configuration which can perform the series of the processes described herein, and the apparatus 1 is not required to have the same configuration as shown in FIG. 2.

The configuration of the image processing apparatus 1 shown in FIG. 2 can be realized by one or plural pieces of software.

When the series of processes are performed by software (a computer program), the computer program is installed on a computer from a recording medium or through a network. The computer can be used, which is mounted on the specialized hardware. A general purpose computer which is installed with various sorts of programs to provide various functions can be used, too.

Removable media (31 in FIG. 1)) with the program recorded thereon are not only distributed to the users separately from the image processing apparatus 1 but also the recording medium can be mounted on the image processing apparatus 1 to provide the user with the program. The removable medium 31 is composed of, for example, a magnetic disk (including a floppy disk) and an optical disk or magneto-optical disk. The optical disk is composed of, for example, CD-ROM (Compact Disk Read Only Memory), DVD (Digital Versatile Disk), and Blu-ray Disc (Registered Trademark). The magneto-optical disk is composed of, for example, MD (Mini-Disk). The recording medium previously mounted on the apparatus 1 is composed of ROM 12 (FIG. 1) with the program recorded thereon and the hard disk included in the storing unit 19 (FIG. 1).

In the present description, it should be noted that the steps writing the program recorded in the recording medium includes not only processes performed along the steps time-serially but processes performed in parallel or independently.

Although specific configurations of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.—

What is claimed is:

1. An image processing apparatus comprising:
a storage that stores plural layout tables of different kinds; and
a CPU that is configured to:
clip plural images from one image in accordance with a spatial and/or temporal clipping standard including a clipping priority order;
select a layout corresponding to the plural clipped images from among the plural layout tables stored in the storage;
obtain priority orders of the plural clipped images; and
spatially or temporally combine the plural clipped images with each other based on the priority orders of the plural clipped images and priority orders of the selected layout, in accordance with a spatial and/or temporal combining standard of the selected layout, thereby generating a new image.

2. The image processing apparatus according to claim 1, wherein the CPU combines, in accordance with the temporal combining standard, the plural images that are clipped in accordance with the spatial clipping standard.

3. The image processing apparatus according to claim 1, wherein the CPU combines, in accordance with the spatial combining standard, the plural images that are clipped in accordance with the temporal clipping standard.

4. The image processing apparatus according to claim 1, wherein the CPU spatially clips a prescribed object portion included in each of images composing the one image as the spatial clipping standard.

5. The image processing apparatus according to claim 4, wherein the prescribed object is a previously registered face of a person.

6. The image processing apparatus according to claim 5, wherein an unspecified face of a person is further included as a prescribed object.

7. The image processing apparatus according to claim 5, wherein a face of a person which is not the object to be clipped by the CPU is previously registered.

8. The image processing apparatus according to claim 1, wherein the CPU temporally clips frames including a prescribed object from frames composing the one image as the temporal clipping standard.

9. The image processing apparatus according to claim 1, wherein the CPU is further configured to:
assign the plural clipped images to regions respectively according to priority order as the spatial combining standard of the selected layout, thereby generating the new image, and
wherein an image represented by the selected layout is spatially divided into the regions and the regions are given respective priority orders.

10. The image processing apparatus according to claim 9, wherein the CPU is further configured to:
select, as the selected layout, a layout that defines the number, sizes or relative positions of images to be combined, corresponding to objects, or the number of the plural clipped images, and
wherein the CPU combines the plural clipped images onto the selected layout, thereby generating the new image.

11. The image processing apparatus according to claim 9, wherein the priority orders of the plural clipped images are obtained depending on previously registered priority orders given respectively to each of objects contained in the one image, or on spatial sizes of clipped object portions.

12. The image processing apparatus according to claim 1, wherein the CPU is further configured to:
connect temporally the plural clipped images with each other according to priority order as the temporal combining standard of the selected layout, thereby generating the new image.

13. The image processing apparatus according to claim 1, wherein the image is one of a moving image and a still image.

14. An image processing apparatus comprising:
a storage that stores plural layout tables; and
a CPU that is configured to:
clip plural images from one image in accordance with a prescribed clipping standard including a clipping priority order;
select, from among the plural layout tables stored in the storage, a layout corresponding to the plural clipped images based on characteristics of the plural clipped images, each of the plural layout tables defining layout elements including the number, sizes, or relative positions of plural images to be combined, and the layout elements of each of the plural layout tables being defined differently from others of the plural layout tables; and
combine the plural clipped images onto the selected layout, thereby generating a new image.

15. The image processing apparatus according to claim 14, wherein the CPU selects the corresponding layout based on the number of the plural clipped images or an object included in the one image as characteristics of the plural clipped images.

16. The image processing apparatus according to claim 14, wherein the CPU clips a prescribed object portion from an image including the prescribed object.

17. A method of processing an image, the method comprising:
clipping plural images from one image in accordance with a spatial and/or temporal clipping standard including a clipping priority order;
selecting a layout corresponding to the plural clipped images from among plural layout tables of different kinds;
obtaining priority orders of the plural clipped images; and
combining spatially or temporally the plural clipped images with each other based on the priority orders of the plural clipped images and priority orders of the selected layout, in accordance with a spatial and/or temporal combining standard of the selected layout, thereby generating a new image.

18. A method of processing an image, the method comprising:
clipping plural images from one image in accordance with a prescribed clipping standard including a clipping priority order;
selecting, from among plural layout tables, a layout corresponding to the plural clipped images based on characteristics of the plural clipped images, each of the plural layout tables defining layout elements including the number, sizes, or relative positions of plural images to be combined, and the layout elements of each of the plural layout tables being defined differently from others of the plural layout tables; and combining the plural clipped images onto the selected layout, thereby generating a new image.

* * * * *